No. 872,659. PATENTED DEC. 3, 1907.
R. S. LORD.
PIPE COUPLING.
APPLICATION FILED JUNE 12, 1906.

WITNESSES.
M. A. Keller.
M. A. Barth.

INVENTOR.
Raymond S. Lord.
by James K. Bakewell
his attorney

UNITED STATES PATENT OFFICE.

RAYMOND S. LORD, OF PITTSBURG, PENNSYLVANIA.

PIPE-COUPLING.

No. 872,659.

Specification of Letters Patent.

Patented Dec. 3, 1907.

Application filed June 12, 1906. Serial No. 321,311.

*To all whom it may concern:*

Be it known that I, RAYMOND S. LORD, of Pittsburg, in the county of Allegheny and State of Pennsylvania, have invented a new and useful Pipe-Coupling, of which the following is a full, clear, and exact description, reference being had to the accompanying drawing, forming part of this specification, in which—

Figure 1:
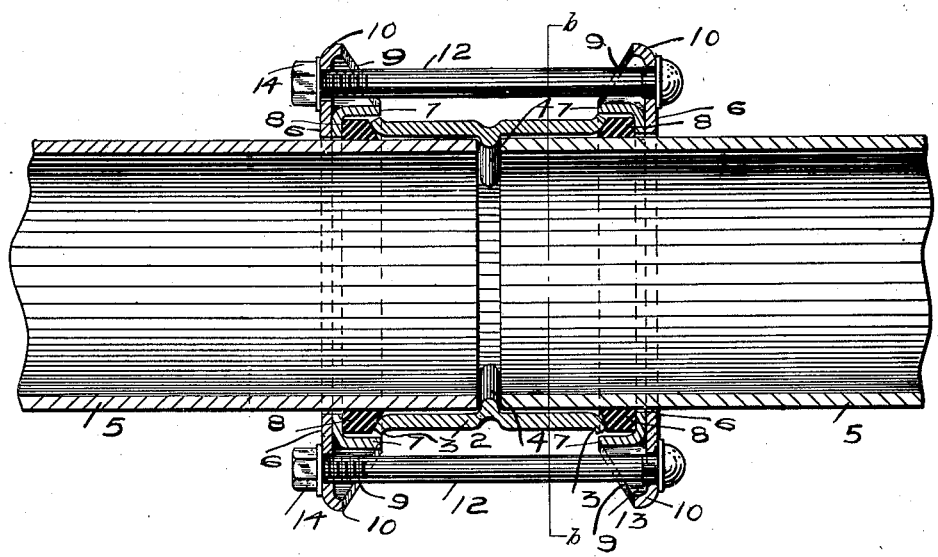
Figure 2:
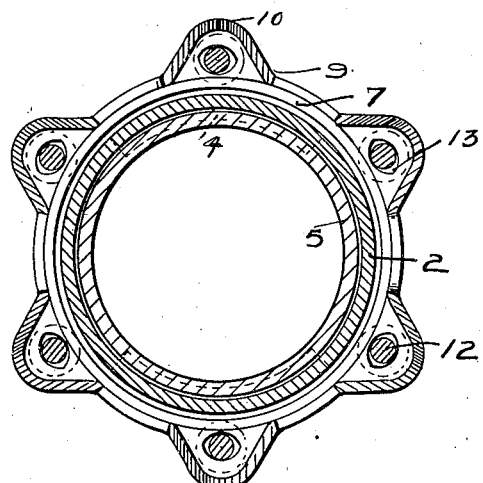
Figure 3:
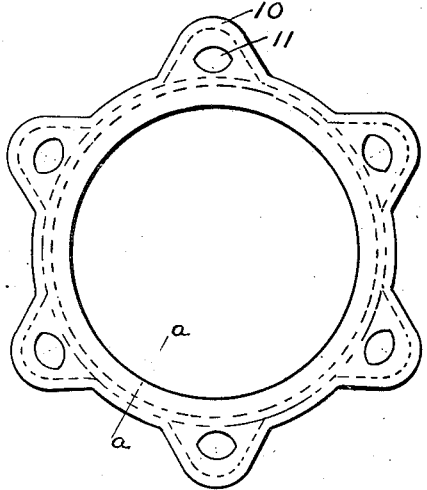
Figure 4:

Figure 1 is a longitudinal vertical sectional view of the ends of two sections of pipe united by a coupler illustrating my invention; Fig. 2 is a cross vertical sectional view on the line $b$—$b$ of Fig. 1; Fig. 3 is a detached plan of the follower ring, and Fig. 4 is a cross section on the line $a$—$a$ of Fig. 3.

My invention relates to couplings for uniting the ends of pipe and its object is to provide a simple rigid coupling having elastic parts that will not readily break, and that will withstand internal pressure and prevent leaking at the joint.

I will now describe my invention so that others skilled in the art may employ the same.

In the drawing 2 represents the coupling sleeve which is formed of steel having flared ends 3 and lugs 4 on its inner circumference at about the middle of the sleeve. This sleeve is of such circumference as to fit readily over the adjacent ends of the two sections of pipe 5, 5. At each end of the sleeve 2 is a steel follower 6 which encircles the pipe sections and serves to draw the gasket 8 into the flaring ends 3 of the sleeve 2 and against the sections of pipe. These followers 6 are formed of two steel rings $c$ and $d$ which are pressed and bent into shape and are shrunk together. The inner ring $c$ has an inner circumference equal to or slightly greater than the outer circumference of the pipe sections 5.

From the outer circumference of the ring $c$ the metal is bent to form a flange 7 concentric with the pipe sections and of sufficient depth and width to inclose the gasket or packing 8. The inner circumference of the outer steel ring $d$ is also equal to or slightly greater than the outer circumference of the pipe sections, while alternate portions 9 of the outer circumference of this ring are pressed and bent concentrically with and over the flange 7 of the inner ring, and alternate portions extend radially forming the lugs 10, which are provided with oval slots 11 for the passage of the securing bolts 12. These bolts are provided with button heads and oval necks 13 and screw nuts 14, and the bolts pass from the lugs of the follower at one end of the sleeve 2 to the follower at the other end of the sleeve. These two rings are shrunk together preferably by heating the outer ring $d$ to a greater degree of temperature than the inner ring $c$ and allowing the outer ring to contract around the inner after they have been pressed together. This produces an elastic follower ring without any weakness from cut away parts, which rings, when united with the sleeve 2 and packing 8, make a strong, light, rigid and non-leakable coupling. The flange portions 7 and 9 not only strengthen the follower, they also prevent any tipping of the followers under the pressure exerted by the bolts 12.

The advantages of my invention which result from the strong, light, elastic followers and from the combination of these followers with the flared steel coupling sleeve and packing will be appreciated by those skilled in the art.

Having thus described my invention, what I claim and desire to secure by Letters Patent is

1. A pipe coupler follower consisting of an inner steel ring, having a flange forming a packing seat, and an outer steel ring having alternating flange portions and lug portions.

2. A pipe coupler follower consisting of an inner steel ring having a flange, and an outer steel ring pressed on the inner ring, said outer ring having pressed lug portions and flange portions engaging said inner ring flange.

3. A pipe coupling consisting of a steel sleeve having flared ends, a packing, and a follower comprising inner and outer rings shrunk together, the inner ring having a flange forming a packing seat, and the outer ring having alternating flange portions and lug portions.

In testimony whereof, I have hereunto set my hand.

RAYMOND S. LORD.

Witnesses:
JAMES K. BAKEWELL,
C. E. EGGERS.